W. N. SPRINGER.
EXCAVATOR BUCKET.
APPLICATION FILED MAR. 1, 1911.

1,136,844.

Patented Apr. 20, 1915.
2 SHEETS—SHEET 1.

Witnesses
Stuart Hilder.
S. Jay Teller

Inventor
William N. Springer
By H. H. Bliss
Attorney

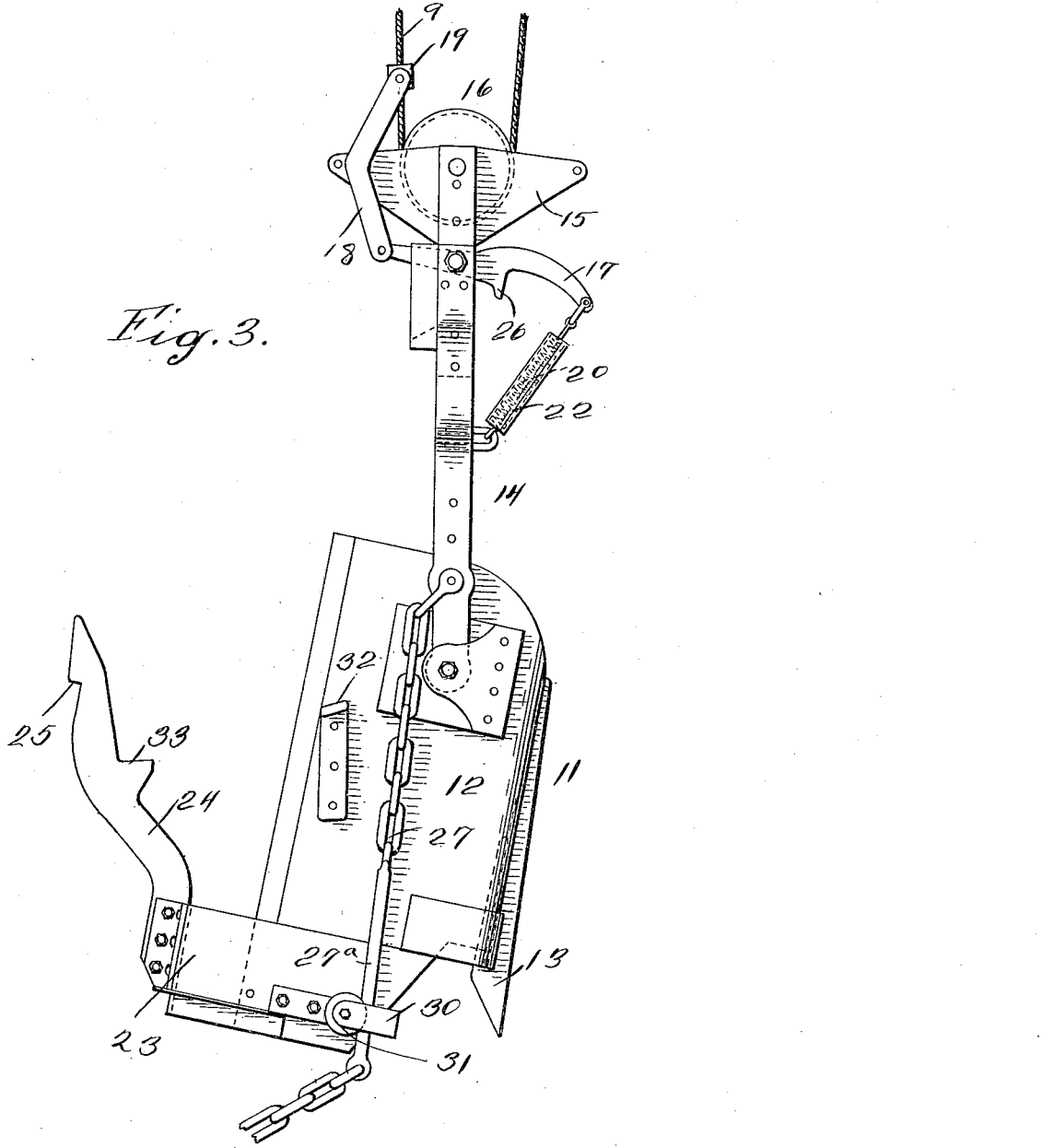

UNITED STATES PATENT OFFICE.

WILLIAM N. SPRINGER, OF PEORIA, ILLINOIS, ASSIGNOR TO AVERY COMPANY, A CORPORATION OF ILLINOIS.

EXCAVATOR-BUCKET.

1,136,844. Specification of Letters Patent. Patented Apr. 20, 1915.

Application filed March 1, 1911. Serial No. 611,564.

*To all whom it may concern:*

Be it known that I, WILLIAM N. SPRINGER, a citizen of the United States, residing at Peoria, in the county of Peoria and State of Illinois, have invented certain new and useful Improvements in Excavator-Buckets, of which the following is a specification, reference being had therein to the accompanying drawing.

This invention relates to improvements in buckets or scoops for excavating or dredging machines.

It has for its object to provide a bucket with dragging, lifting and holding devices so arranged that it can be first drawn endwise for loading it while the lifting mechanism is inactive, then bodily lifted with its load while the loading mechanism is inactive, then allowed to tilt on the releasing of a latching mechanism for the dumping of its load, then lowered, and then have the dragging or loading mechanism first lock it to the lifting mechanism and thereafter cause it to be loaded again.

Figure 1 is a side elevation of a bucket or scoop embodying my improvement; Fig. 2 is a rear end view; Fig. 3 is a side view showing it in dumping position.

The mechanism for actuating the power transmitters which apply the power for dragging, loading, lifting, locking and unlocking the bucket is not shown in the drawings. The power transmitters are the ropes 9 and 10. 11 represents, as an entirety, the mechanism to which they are connected.

12 indicates the bucket, open at its forward end, and closed at the rear end. Toothed skids 13 are provided at the edge of the open end for loosening the earth or the material to be loaded, and for supporting the bottom part of the bucket.

Fig. 3 illustrates the apparatus at the time the load is being discharged from the bucket, it being then released from the devices which hold it in load-carrying position relative to the hoisting devices, as illustrated in Fig. 1.

Figure 1:
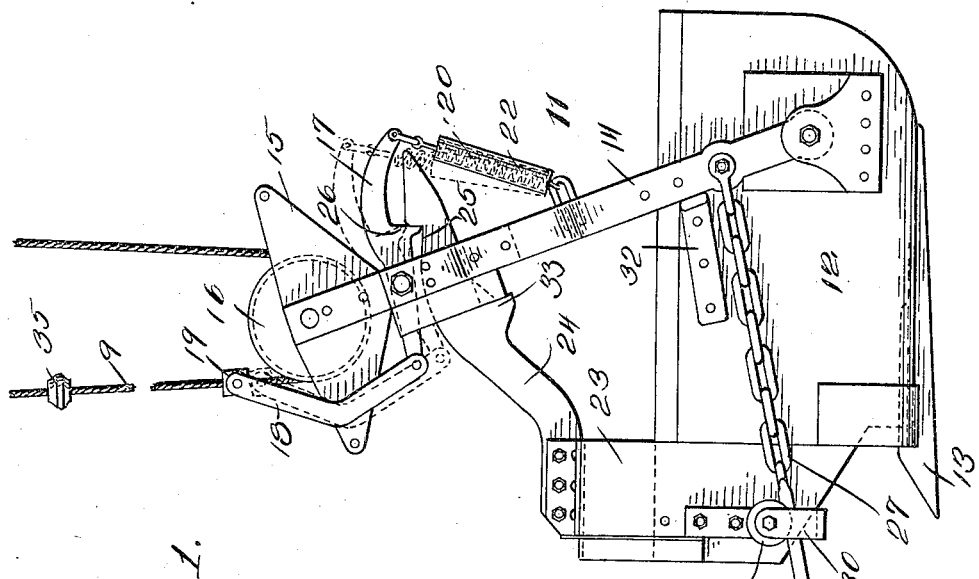
Fig. 1 illustrates the mechanism when the parts are in the positions for loading the bucket, the latter at this time being locked in place relative to the hoisting devices.
Figure 2:
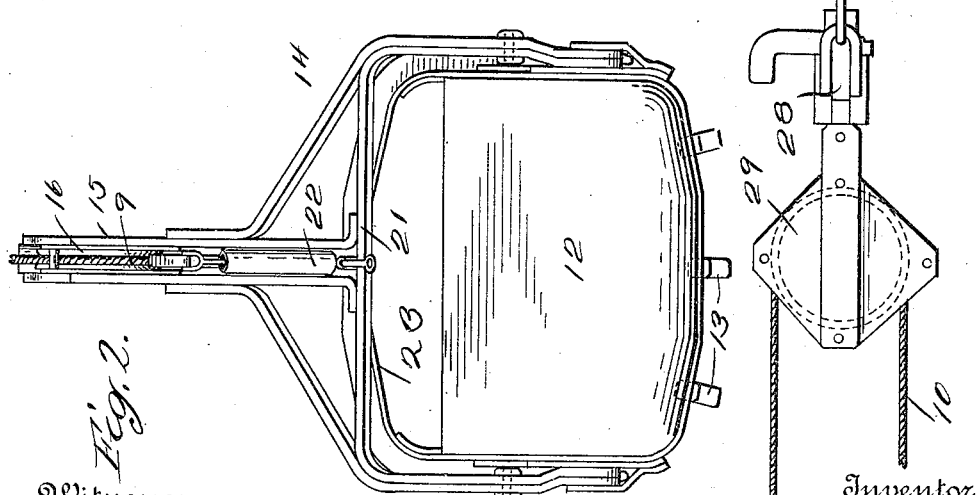

14 is a bail having its lower ends pivotally connected to the bucket near its rear end. The hoisting line 9 is connected to this bail. As shown, the line engages with a pulley 16 carried by a block 15, secured to the bail.

The drag line, to be more fully described, is also secured to the bail at points near the lower ends, this line serving not only to effect the latching or locking of the bucket in proper position relatively to the hoisting devices, but also applying the power by which the bucket is dragged forward and loaded.

17 is a latch pivotally mounted on the bail 14, and 20 is a spring, within a casing 22, interposed between the latch and a cross bar 21 of the bail.

24 is a latch bar carried by the bucket, being secured to the brace arch or bridge 23 and projecting backward toward the bail. It has a shoulder or notch at 25 which is adapted to be engaged by the tooth 26 on the pivoted latch bar 17, the spring 20 tending to hold the engaging latch elements in position.

The draft line comprises the power transmitting rope element 10 and the parts interposed between the rope and the bail. On each side of the bucket there is a section 27 of chain, and to these is connected a link 27ª. The latter is joined by a short chain section to the link 28, carrying the pulley and block 29, to which the rope 10 is connected. On each side of the bucket there is a guide 30 for the draft line, each guide having an anti-friction roller 31. The draft devices can, when tension is applied, have a limited backward and forward or sliding movement relative to the bucket. When tension is exerted on the draft line it first swings the bail forward toward the latch bar 24, the swinging movement being limited by the stops at 32 on the bucket and 33 on the latch bar.

The parts of the drag line being situated partly on one side of the bucket and partly on the other side, and connected to the bail near the rear end of the bucket, at points near the bail hinge axis, the bucket is caused to right itself immediately prior to the loading, and then caused to lock itself to the lifting bail as the latter is relatively swung forward under the tension of the draft as described. The attachment of the draft to the rear end of the bucket, if not controlled, will have a tendency to draw the rear end of the bucket up or down in relation to the front end to an undesirable extent. But there is control provided by the guides at 30, 31, one on each side, and situated at the front end of the bucket. These furnish abutments against which the drag devices have a bearing, vertically, sometimes downward, but generally upward, and relatively to which the said devices have longitudinal or sliding movement. They permit all necessary variation in the inclination of the bottom of the bucket to the line of draft, but insure that the bucket shall advance in such manner as to gather a load and be prevented from having its rear end thrown forward around the fingers 13 or having the latter thrown up too far in relation to the draft line.

The latching mechanism is released by power devices.

18 are links pivoted to the latch bar 17 and carrying a trip device 19.

35 is a companion trip element preferably carried by the lifting rope and actuated from the hoisting drum or engine which transmits power through the rope. The tripping can be effected wherever desired by suitably varying the position of the trip element 35 in relation to the power devices.

The manner in which the mechanism operates will be readily understood. When the hoisting devices are lowered the bucket reaches the ground and as soon as tension is exerted on the drag line the bucket rights itself and the bail is drawn to the position shown in Fig. 1 and is latched. The continuing of the draft draws the bucket into the earth which is to be lifted until a load is secured. The drag line is then relieved of tension and the hoisting rope is actuated, the lifting continuing until the latch bar 17 is tripped, whereupon the bucket automatically turns on the bail hinge into the dumping position shown in Fig. 3.

What I claim, is:

1. The combination of a bucket, a hoisting bail pivoted thereto, a latching mechanism for connecting the bail rigidly to the bucket, a drag line attached to the bail, guide means for the drag line whereby tension thereon swings the bail to the latching mechanism and whereby the shoveling edge of the bucket is held in predetermined relation to the line of drag, and power operated means coöperating with the latching mechanism to release it when the draft line is relieved of tension.

2. The combination of a bucket, a hoisting bail pivoted to the bucket, a releasable latching mechanism for connecting the bail rigidly to the bucket when the bail is swung forward, a drag line slidably connected with the bucket and attached to the hoisting bail whereby it can swing the bail forward into engagement with the latching mechanism when the draft line is advancing, means to limit the forward swing of the bail, and a power actuated releasing means coöperating with the latching mechanism.

3. The combination of a bucket open at one end and closed at the other, a bail pivoted thereto near the closed end, a hoisting line and a drag line both attached to the bail, one above the top of the bucket and the other below said top, a latching mechanism for connecting the bail rigidly to the bucket, a guide means on the bucket engaging with the drag line whereby tension on said line swings the bail forward toward said latching mechanism, and power actuated means for releasing the latching mechanism, substantially as set forth.

4. In an apparatus for excavating, the combination of a shovel open at one end, a bail secured to the other end, a latch mechanism adapted to lock the shovel and the bail in proper relative positions for lifting, a lifting means connected with the bail, means for releasing the latch mechanism and a flexible draft device connected at its end with the bail at a point above its point of connection with the shovel, the said draft device also having sliding engagement with the forward end of the shovel whereby when tensioned, it tends both to lift the forward end of the shovel and to draw the upper end of the bail forward to facilitate the engagement of the latch mechanism.

5. The combination of a bucket, a hoisting bail pivoted to the bucket, a hoisting line attached thereto, releasable latching mechanism for connecting the bail rigidly to the bucket when the bail is swung forward, a drag-line independent of the aforesaid hoisting line slidably connected with the bucket and attached to the hoisting bail whereby to swing the same forward into engagement with the latching mechanism when the drag-line is advanced and means coöperating with the latching mechanism to release the same.

6. The combination of a bucket having a forwardly open end, a hoisting bail pivoted to the bucket, guides at the sides of the bucket, a drag-line having branches passing through said guides and connected to the bail to swing the latter forward on its pivots when the drag-line is advanced, releasable mechanism for locking the bail to the bucket when the bail is swung forward by the drag-line, and means coöperating with the bail mechanism to release the same.

7. The combination of a bucket having a forwardly open end and provided with line-guides thereat, a hoisting bail pivoted to the bucket adjacent to the rear thereof, a drag-line having branches passing through said line guides and connected to the bail, releasable latching mechanism carried by the forward portion of the bucket to lock the bail thereto when the same is swung forward by advancing the drag-line, and means coöperating with the latching mechanism to release the same.

8. The combination of a bucket, a hoisting bail pivoted to the bucket, releasable latching mechanism for connecting the bail rigidly to the bucket when the bail is swung forward, a drag-line slidably connected with the bucket and attached to the hoisting bail whereby to swing the same forward into engagement with the latching mechanism when the said line is advanced, means to limit the forward swing of the bail and means coöperating with the latching mechanism to release the same.

9. The combination of a bucket, a hoisting bail pivoted thereto, releasable latching mechanism for connecting the bail rigidly to the bucket when the bail is swung forward, a drag line passing through guides on the bucket and attached to the hoisting bail whereby to swing the bail forward into engagement with the latching mechanism when the drag line is advanced, means to limit the forward and rearward movement of the bail, and means coöperating with the latching mechanism to release the same.

10. The combination of a bucket, a bail pivoted to said bucket, a hoisting line attached to said bail, a drag line slidably connected to the bucket and fastened to the bail, a latching mechanism associated with the said bucket, said drag line adapted to swing the bail forward into engagement with the latching mechanism, and means to release said latch.

11. The combination of a bucket, a hoisting bail pivoted thereto, releasable latching mechanism for connecting the bail rigidly to the bucket when the bail is swung forward, a drag line passing through guides on the sides of said bucket and attached to the hoisting bail, whereby to swing the bail forward into engagement with the latching mechanism when the drag line is advanced, and means coöperating with the latching mechanism to release the same.

In testimony whereof I affix my signature, in presence of two witnesses.

WILLIAM N. SPRINGER.

Witnesses:
J. M. CALDWELL,
L. M. STACY.

Copies of this patent may be obtained for five cents each, by addressing the "Commissioner of Patents, Washington, D. C."